(12) United States Patent
Chatel

(10) Patent No.: US 10,492,499 B2
(45) Date of Patent: Dec. 3, 2019

(54) FOOD PRODUCT WITH FILLING

(71) Applicant: The Quaker Oats Company, Chicago, IL (US)

(72) Inventor: Robert Chatel, Hoffman Estates, IL (US)

(73) Assignee: The Quaker Oats Company, Chicago, IL (US)

(*) Notice: Subject to any disclaimer, the term of this patent is extended or adjusted under 35 U.S.C. 154(b) by 1029 days.

(21) Appl. No.: 14/615,088

(22) Filed: Feb. 5, 2015

(65) Prior Publication Data

US 2015/0150289 A1   Jun. 4, 2015

Related U.S. Application Data

(62) Division of application No. 11/945,834, filed on Nov. 27, 2007, now Pat. No. 8,980,355.

(51) Int. Cl.
| | | |
|---|---|---|
| *A23L 7/122* | (2016.01) | |
| *A21C 11/16* | (2006.01) | |
| *A21C 9/06* | (2006.01) | |
| *A23G 3/34* | (2006.01) | |
| *A21C 9/04* | (2006.01) | |
| *A23P 20/20* | (2016.01) | |
| *A23P 20/25* | (2016.01) | |
| *A23L 7/17* | (2016.01) | |

(52) U.S. Cl.
CPC .............. *A21C 11/16* (2013.01); *A21C 9/045* (2013.01); *A21C 9/066* (2013.01); *A23G 3/0065* (2013.01); *A23L 7/122* (2016.08); *A23L 7/17* (2016.08); *A23P 20/20* (2016.08); *A23P 20/25* (2016.08); *A23V 2002/00* (2013.01)

(58) Field of Classification Search
USPC .......................... 426/618, 619, 620, 94, 283
See application file for complete search history.

(56) References Cited

U.S. PATENT DOCUMENTS

| | | | | |
|---|---|---|---|---|
| 4,696,825 A | * | 9/1987 | Leibfred | ................. A21C 15/02 426/283 |
| 4,738,859 A | * | 4/1988 | Kenneally | .............. A21D 13/22 426/275 |
| 2004/0022901 A1 | * | 2/2004 | Funk | ........................ A23B 7/08 426/94 |

* cited by examiner

*Primary Examiner* — Lien T Tran
(74) *Attorney, Agent, or Firm* — James R. Gourley; Carstens & Cahoon, LLP

(57) ABSTRACT

The bulk density of food products with a center fill mat can be reduced by expanding the food strands making up the center fill mat. A method for producing food products with fillings having low bulk density includes preparing the food strands by passing dough through small holes, and enclosing the food strands by a first layer and a second layer.

3 Claims, 5 Drawing Sheets

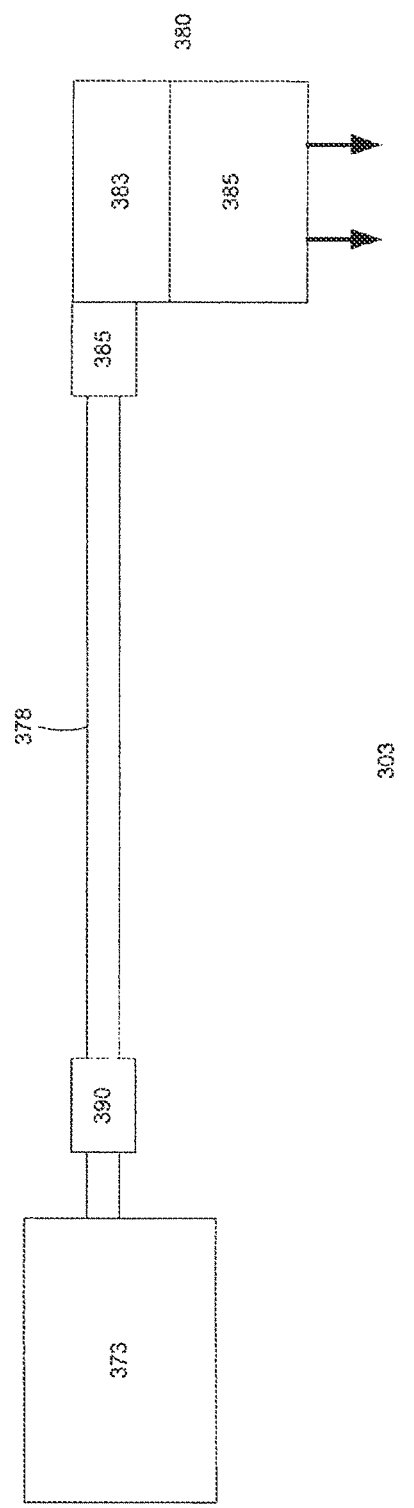

FOOD PRODUCT WITH FILLING

This application is a divisional of co-pending U.S. application Ser. No. 11/945,834 entitled "Food Product with Filling" filed on Nov. 27, 2007 now U.S. Pat. No. 8,980,355, the technical disclosure of which is hereby incorporated herein by reference.

FIELD OF THE INVENTION

The present invention relates generally to food products, and more particularly to a method of preparing food products with fibrous fillings.

BACKGROUND OF THE INVENTION

Breakfast cereals typically are made from various types of cereal grains. Since cereal grains are known to contain numerous nutrients that are important for promoting good health, they have long been a staple part of our diet. To make breakfast cereals interesting to eat, food manufacturers have produced them in numerous flavors and textures. Some breakfast cereal products include a filling that may impart a different flavor and/or texture than the encasement. Typically, such cereal products include a cereal shell containing shredded cereal as the filling.

Conventional techniques for forming the filling include pressing dough pellets through a pair of counter rotating shredding rolls. One roll is grooved while the other one is smooth. As the dough pellets pass through the rotating rolls, the pellets are shredded to form cereal shreds. However, conventional techniques forming cereal shreds have resulted in the rolls having a high wear rate. This requires the rolls to be frequently replaced, thereby increasing operating costs.

From the above discussion, it is desirable to provide an improved cereal with filling that, among other things, reduces operating cost.

SUMMARY OF THE INVENTION

The present invention relates to a food product having a filling. The food product can be a cereal product. The food product typically has a lower bulk density than conventional food products. In one aspect of the invention, a method is disclosed which produces the food product by preparing first and second layers for forming the outer shell of the food product, preparing food strands by passing dough through small holes, depositing the food strands on the first layer to form a center-fill mat thereon, and covering the first layer and the center-fill mat with the second layer to form the food product. The food strands can be expanded prior to being deposited on the first layer to form a food product having low bulk density.

In another aspect, a system is disclosed for producing the food product having a filling. The system comprises first and second sheet forming units for forming first sheets and second sheets, a strand forming unit for forming strands by passing dough through small holes and depositing the strands randomly on the first sheet to form the center-fill mat thereon. The first sheet can be conveyed below the strand forming unit by a conveyor belt.

These and other objects, along with advantages and features of the present invention herein disclosed, will become apparent through reference to the following description and the accompanying drawings. Furthermore, it is to be understood that the features of the various embodiments described herein are not mutually exclusive and can exist in various combinations and permutations.

BRIEF DESCRIPTION OF DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which:

FIG. 3 shows a strand forming system for forming food strands in accordance with one embodiment of the invention;

DETAILED DESCRIPTION OF THE INVENTION

Figure 1A:
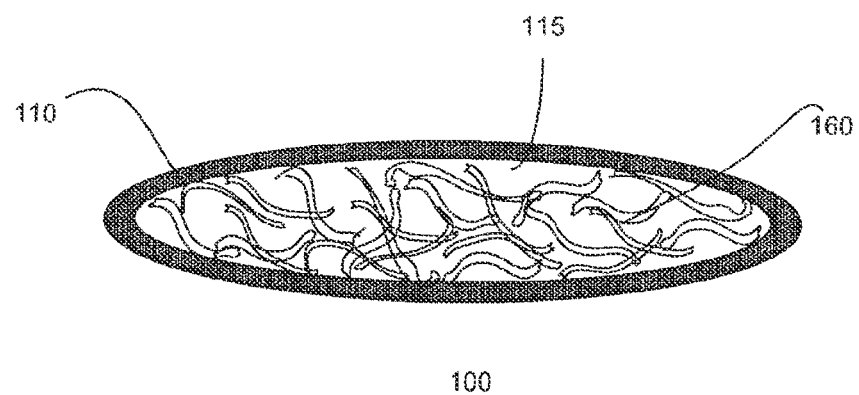
FIGS. 1a and 1b show a cross-sectional view and a top view respectively of a food product with a center-fill in accordance with one embodiment of the invention.
Figure 1B:
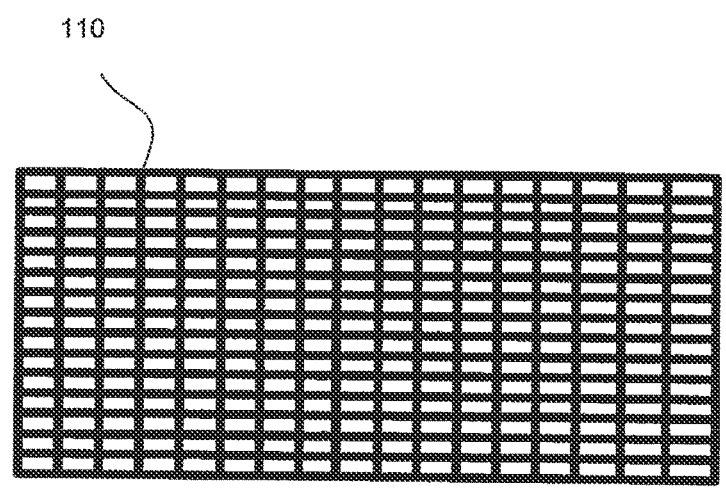

The invention relates generally to food products with a filling. In one embodiment, the food product comprises a cereal product having a center filling. Other types of food products with fillings are also contemplated and within the scope of the invention. FIGS. 1a-b show cross-sectional and top views of a center-filled cereal product or biscuit 100 in accordance with one embodiment of the invention. The cereal product includes a filling 160 encased within an encasement or outer shell 110.

The outer shell, in one embodiment, comprises cereal. Various types of cereal flour can be used to form the outer shell. For example, the outer shell can be formed from oat, wheat, maize, rice, barley, millet, sorghum (milo), rye, triticale, teff, wild rice, spelt, buckwheat, amaranth, quinoa, kañiwa, cockscomb, or combinations thereof. Typically, the outer shell comprises oat, wheat, corn, and rice. Other types of grains or non-cereal material can also be useful to form the outer shell. Additional ingredients may also be added, such as flavoring agents, coloring agents, sweeteners, salt, food stabilizers, as well as vitamins and minerals. For example, sugar, calcium carbonate, disodium phosphate, reduced iron, niacinamide, zinc oxide, BHT, thiamin mononitrate, pyridoxine hydrochloride, riboflavin, folic acid, and yellow coloring (#5 and #6) are added to the flour to form the outer shell.

The outer shell comprises a rectangular shape, as shown in FIG. 1b. The outer shell, in one embodiment, comprises a web design. Such web type design, for example, may be similar to Life® cereal from The Quaker Oats Company. Providing an outer shell having other shapes, designs, or configurations is contemplated and within scope of invention. For example, the outer shell can comprise other shapes such as polygonal shapes like triangles, pentagons or hexagons. Preferably, the shapes of the shell are selected to minimize waste of material by providing good fit between adjacent pieces. In one embodiment, the outer shell is formed by two layers, creating a center space, void 115, (as shown in FIG. 1a) that contains the filling material. Typical dimensions for the cereal biscuit are about 19 mm (0.75 inches) wide and about 21 mm (0.81 inches) long. Other dimensions are contemplated and within the scope of invention.

As shown, the center filling includes shreds or strands, forming a center-fill mat. The cereal strands can include the same or similar ingredients as that of the outer shell. Adding or using other ingredients can also be useful for forming the strands. The strands are disposed within the center space. Typically, the strands are disposed randomly within the center space to reduce the bulk density of the product. Additional ingredients, such as coarse or sanding sugar, colored bits, fruit pieces and nut pieces, can be added onto the center-fill mat. The filling can provide a different flavor, texture, color or a combination thereof to make the cereal more desirable to consume.

In one embodiment, the strands comprise expanded strands. The strands are expanded prior to being disposed within the center space. This can be accomplished by, for example, passing dough through small holes such that the release in pressure causes liquid water in the dough to become steam, creating voids in the dough and forming expanded strands. The expanded strands can then be disposed on one of the outer shell layer before being covered by the other outer shell forming the cereal biscuit. Providing expanded strands in the center space produces a cereal biscuit with a lower bulk density than conventional cereal biscuits. The bulk density of a cereal biscuit can be reduced by about 5-25% and preferably about 10-20%. For example, conventional cereal biscuits which typically have a bulk density of about 180 grams/liter can be reduced to about 160 grams/liter. Reducing the bulk density of the cereal biscuit by other amounts is contemplated and within scope of invention. By lowering the bulk density, the volume of the product can be maintained while reducing its weight. This advantageously reduces the amount of raw materials required, which translates to lower costs and higher profits for the manufacturer.

Figure 2:
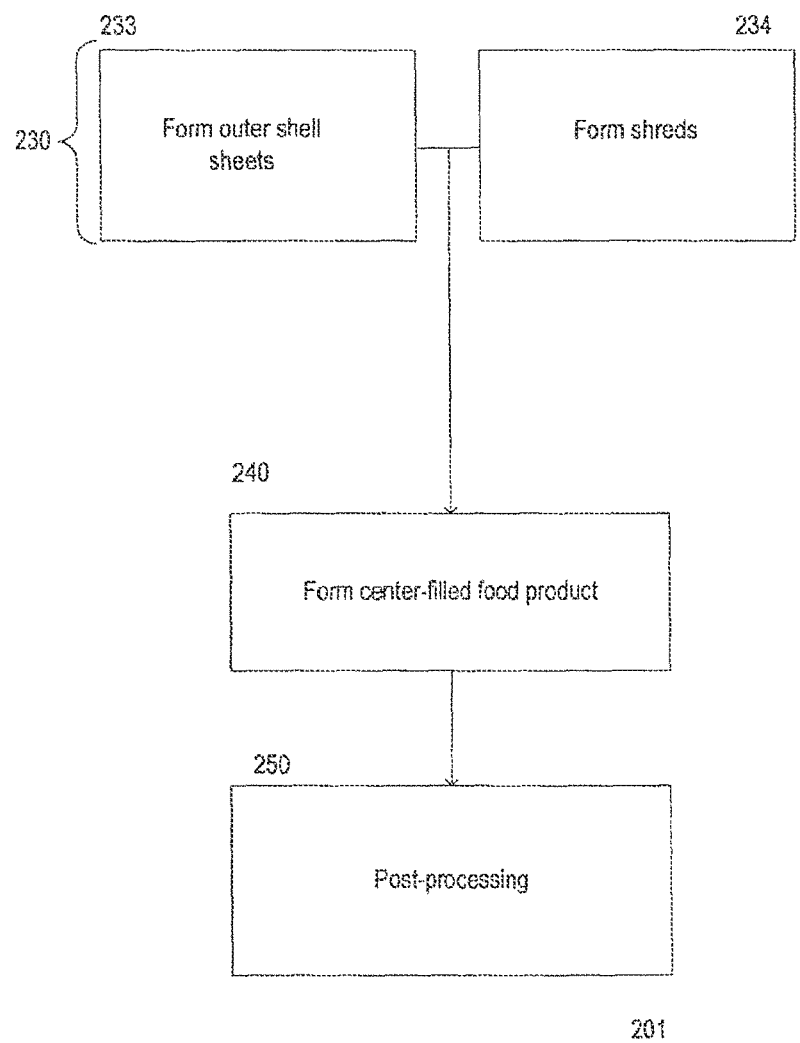
FIG. 2 shows a process of forming a food product in accordance with one embodiment of the invention.

FIG. 2 describes a process 201 for manufacturing a center-filled cereal product in accordance with one embodiment of the invention. Preprocessing commences at step 230. The preprocessing includes preparing the outer shell sheets or layers at step 233. The outer shell sheets form, for example, the encasement of a cereal biscuit.

The outer shell layers, in one embodiment, are formed from flour of cereal grains, such as oat, wheat, maize, rice, barley, millet, sorghum (milo), rye, triticale, teff, wild rice, spelt, buckwheat, amaranth, quinoa, kañiwa, cockscomb or a combination thereof. Other types of grains or non-cereal ingredients are contemplated and within scope of invention to form the outer shell. Additional ingredients may also be added, such as flavoring agents, coloring agents, sweeteners, salt, food stabilizers, as well as vitamins and minerals. In one embodiment, sugar, calcium carbonate, disodium phosphate, reduced iron, niacinamide, zinc oxide, BHT, thiamine mononitrate, pyridoxine hydrochloride, riboflavin, folic acid, and yellow coloring (#5 and #6) are added to the flour. Providing other types of ingredients or additional ingredients to the flour is contemplated and within the scope of invention.

The ingredients are mixed to form dough and cooked. Various techniques can be used to mix and cook the dough. For example, the mixing and cooking can be performed in an integrated continuous process using an extruder. Other techniques that are well-known in the art can also be used. In one embodiment, an extruder is used to mix the ingredients and cook the dough.

Dough sheets are formed from the cooked dough. In one embodiment, two dough sheets are formed, one serving as the bottom half with the other serving as the top half of the cereal biscuit. Various conventional processes that are well-known in the art can be used to prepare the dough sheets. For example, sheeting rolls can be used to form continuous dough sheets. In one embodiment, the dough sheets comprise a web-like design or structure. Other types of design may also be useful such as V-shaped ripples or smooth structure, depending on whether smooth or corrugated sheeting rolls are used. Other techniques can also be used to form dough sheets from the dough.

The preprocessing also includes preparing the filling or center-fill mat for the cereal biscuit at step 234. In one embodiment, the center-fill mat comprises cereal strands. The cereal strands can be formed from the same or similar ingredients as the outer shell. Providing cereal strands formed from different or additional ingredients is also useful. In one embodiment, the ingredients of the strands include flavoring agents, coloring agents, sweeteners, salt, food stabilizers, vitamins, minerals or combinations thereof. Providing other types of ingredients or additional ingredients to the flour is contemplated and within the scope of invention.

The ingredients are mixed to form dough and cooked. Various conventional techniques can be used to mix and cook the dough used for the filling. After the dough is cooked, it is processed to form cereal strands. In one embodiment, the dough is processed to form expanded cereal strands. The processing to form strands includes, in one embodiment, pumping the dough through a die having a plurality of small holes to form strands. A spin pack having a plurality of dies through which the dough is pumped can be used.

The weight, texture, bulk density and durability of the center fill mat can be controlled by various parameters. These parameters include, but are not limited to, the size and shape of the die holes, the number of holes on the die, and the layout of the holes. The shape of the holes can be polygonal or curved. In one embodiment, the holes are circular in shape and about 0.02 inches in diameter. Other hole shapes or sizes are contemplated and within the scope of invention. For example, a curved shape such as a "S" shaped hole will produce hollow strands, which further reduces the bulk density of the center fill mat. The number of holes on the die, for example, is about 426. Providing other numbers of holes is contemplated and within the scope of invention. Generally, providing a higher number of holes will increase the bulk density.

To ensure that most of the dough material passes through the holes of the die, the ingredients of the dough should be sufficiently fine. For example, the particle size of the ingredients should be smaller than the holes in the die. In one embodiment, the particle size is about 10% to about 20% smaller than the holes in the die. Typically, the average particle size of the dough ingredients is about 0.016 inches to about 0.020 inches for a die having orifices of about 0.020 inches to about 0.025 inches wide. A filter can be provided to remove undesirably large particles before the dough ingredients are mixed or passed through the die. The viscosity of the dough is typically low enough to ensure the dough passes through the die holes easily without excessive pressure. The desired viscosity can be achieved by adjusting, for example, the moisture level and temperature. Generally, higher moisture content and higher temperatures will result in lower viscosity. The moisture, for example, is about 30% to about 40%. Preferably, the moisture content is about 34% to about 35%.

In one embodiment, the dough is maintained at a sufficiently high temperature or above a threshold temperature prior to passing through the die to result in expanded strands. The threshold temperature is above the boiling point of water. The threshold temperature, for example, is about 108° C. (225° F.). Other threshold temperatures above the boiling point of water are also useful. Typically, the dough is heated during cooking. Downstream equipment can be heated to maintain dough temperature, reducing or eliminating heat loss prior to passing through the die holes. Heating, for example, can be achieved using electric heaters or steam.

Pressure is applied to the dough to cause it to pass through the holes in the die. In one embodiment, expanded strands are formed. As the dough exits the holes, the pressure drops, causing liquid water in the dough to become steam. The steam forms cells or bubbles within the dough, expanding the volume of the resulting strands. Typically, the strands are expanded to about 2 to 3 times their original volume. Other degrees of expansion are also useful. The degree of expansion is generally dependant on the temperature and moisture content of the dough. Greater expansion is achieved by increasing the temperature and moisture content of the dough.

In an alternative embodiment, the strands are unexpanded. To form unexpanded strands, the dough is cooled below the boiling point of water <100° C. (<212° F.) prior to passing it through the die. Typically, the dough is cooled to about 88° C. to 94° C. (190° F. to 200° F.).

With the use of expanded strands in accordance with the invention, a center-fill mat that has greater loft than conventional center-fill mats can be produced, which requires fewer strands to fill a given volume. This results in a cereal biscuit that is less dense, providing a lighter texture. Additionally, a less dense food product may also facilitate weight control or dieting as there would be fewer calories consumed for a given volume. Furthermore, by requiring fewer strands to fill the same volume, the amount of raw materials is reduced, hence reducing production costs and advantageously increasing profits for the manufacturer.

At step 240, the intermediate products of pre-processing are processed to form the center-filled product. In one embodiment, processing comprises depositing the strands onto a first outer shell sheet to form the center-fill mat. After the center-fill mat is formed on the first outer shell sheet, the second outer shell sheet is added on top of the center-fill mat. This forms a food product with filling. Additional ingredients, such as coarse sugar, can be added onto the center-fill mat prior to covering it with the second outer shell. Other types of ingredients can also be added.

The process parameters, such as the velocity of the conveyor belt and dough extrusion can be selected to produce the center-fill mat with the desired characteristics. In one embodiment, the velocity of strands extruded from the die is sufficiently faster than the velocity of the conveyor belt to produce a center-fill mat with the desired height. As the strands fall onto the slower moving conveyor belt, they entangle with one another as they fall, resulting in a mat with more voids and lower bulk density. In one embodiment, the velocity of the strands exiting the die is about 5 to about 15 times faster than the velocity of the belt. Other velocities are also useful, depending on the desired dimensions of the center-fill mat.

The processed intermediate products are post-processed at step 250. Post-processing comprises, for example, scoring the intermediate products to form cereal biscuits. Post processing can also include, for example, baking or toasting the cereal pieces. Typically, the cereal pieces are toasted at a temperature of about 204° C. to about 315° C. (400° F. to about 600° F.). After toasting, the cereal biscuits are cooled and packaged.

FIG. 3 shows a strand forming system 303 for forming food strands in accordance with one embodiment of the invention. The system includes a dough cooker or extruder 373 coupled to a spin pack 380. The two units are coupled to each other via a coupler 378. The coupler, for example, comprises an insulated pipe for passing materials from the cooker 373 to the spin pack 380. Typically, the pipe is about 19 mm to about 38 mm (0.75 to about 1.5 inches) in diameter. Providing a coupler having other sizes are contemplated and within the scope of invention. In one embodiment, a first pump 390 located at the discharge of the cooker pushes the dough through the coupler 378 to the spin pack 380. The pump can be a gear pump or any conventional pump known in the art.

The cooker 373 mixes and cooks the ingredients to form dough. The dough is used to form strands in accordance with one embodiment of the invention. The dough can also be used to form the outer shell of the product. In such an embodiment, an additional coupler (not shown) is provided to convey the dough to, for example, counter-rotating rolls to form the lower and upper sheets.

The dough from the cooker is conveyed through the coupler 378 to the spin pack 380. In one embodiment, the spin pack 380 includes a filtration cavity 383 and a spinneret or die plate 385. The filtration cavity is designed to remove particles that will not pass through the spinneret. The dough exiting the coupler is drawn into a second pump 385 that controls the flow of the dough through the spinneret. The second pump pushes the dough into the filtration cavity. The pressure is sufficient to extrude the dough from the die at a desired velocity. In one embodiment, the pressure is sufficient to extrude the dough to form a center-fill mat of the desired characteristics on the dough sheet.

In one embodiment, the spin pack further comprises an outer jacket. The outer jacket maintains thermal uniformity of the dough in the spin pack. Maintaining thermal uniformity ensures uniform flow through the spinneret. The jacket is typically electrically heated with, for example, calrod heating elements. Alternatively, the jacket could be heated with steam. Other types of heating methods contemplated and within the scope of invention.

Figure 4A:
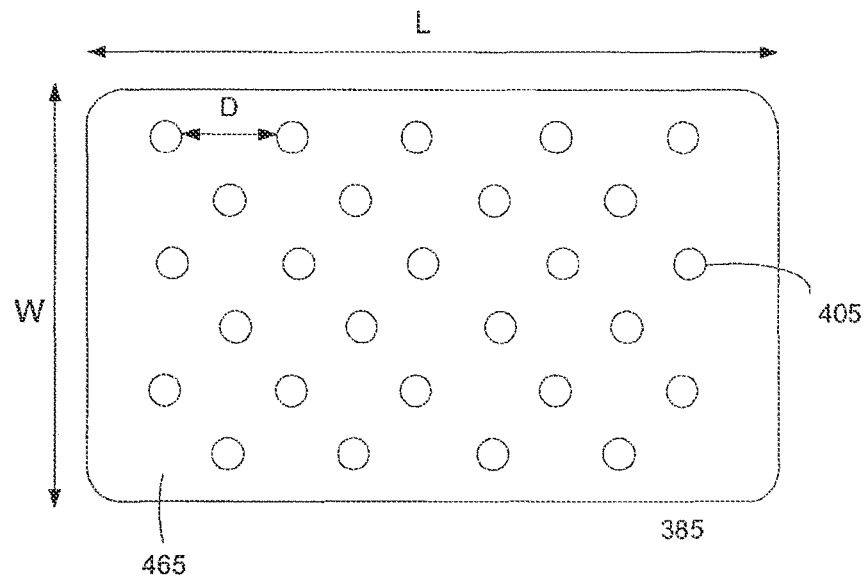
FIGS. 4a-b show planar view and cross-sectional view respectively of a spinneret in accordance with one embodiment of the invention.
Figure 4B:
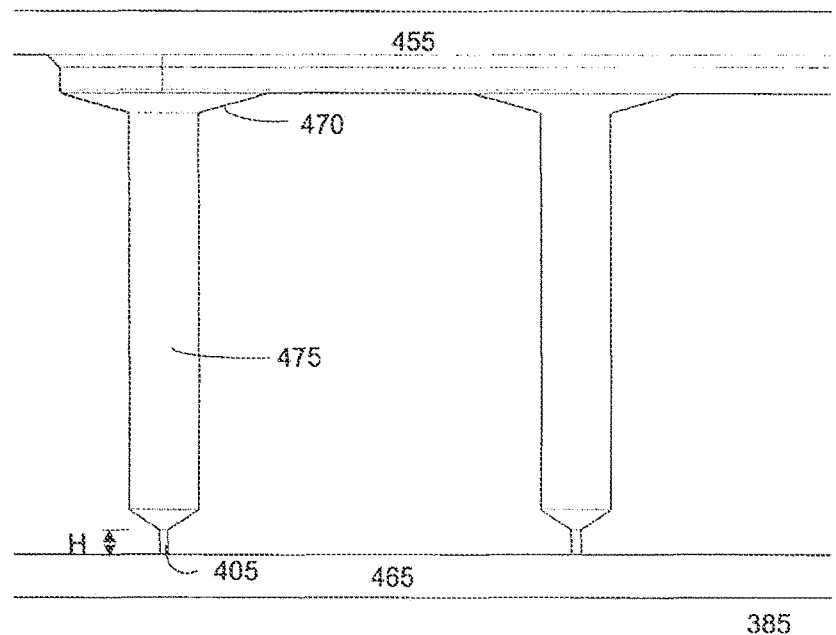

FIGS. 4a-b show the planar and cross-sectional views respectively of a spinneret 385 in accordance with one embodiment of the invention. The spinneret has a plurality of holes 405, as shown in FIG. 4a. Providing a die sub-unit with a plurality of dies is contemplated and within the scope of invention. The holes, for example, are circular and have a diameter of about 5 mm (0.20 inches). Other geometric shapes or sizes are contemplated and within the scope of invention. Typically, the spinneret is rectangular. Other shapes are contemplated and within the scope of invention. The die's length L is typically slightly less than the width of a laydown belt (or conveyor) conveying the bottom sheet beneath the spinneret. The width W of the die depends upon the number of holes and their optimum spacing, D. The number of holes is related to the scale of the equipment. For example, L can be about 48 cm (19 inches), and W can be about 9 cm (3.5 inches), and the spinneret can contain about 426 holes. Other die sizes and number of holes are contemplated and within the scope of invention. The holes can be arranged in a desired pattern, such as a staggered, half-staggered, or a non-staggered pattern.

FIG. 4b shows the cross-sectional view of a spinneret, in accordance with one embodiment. The spinneret comprises an upper portion 455 and a lower portion 465. The upper portion comprises a plurality of countersinks 470 and the lower portion comprises a plurality of holes 405. The countersinks and holes are coupled by a capillary 475. The dough enters the spinneret through the countersink 470, passes through the capillary 475, and exits the spinneret though the hole 405. The diameter (d1) of the countersink is typically larger than the diameter (d2) of the capillary, and the diameter of the capillary is typically larger than the diameter (d3) of the hole. In one embodiment, d1 is about 11 mm (0.44 inches), d2 is about 4 mm (0.15 inches) and d3 is about 0.5 mm (0.02 inches). The height (H) of the hole is, for example, about 1.2 mm (0.05 inches). Other dimensions are contemplated and within the scope of invention.

Figure 5:
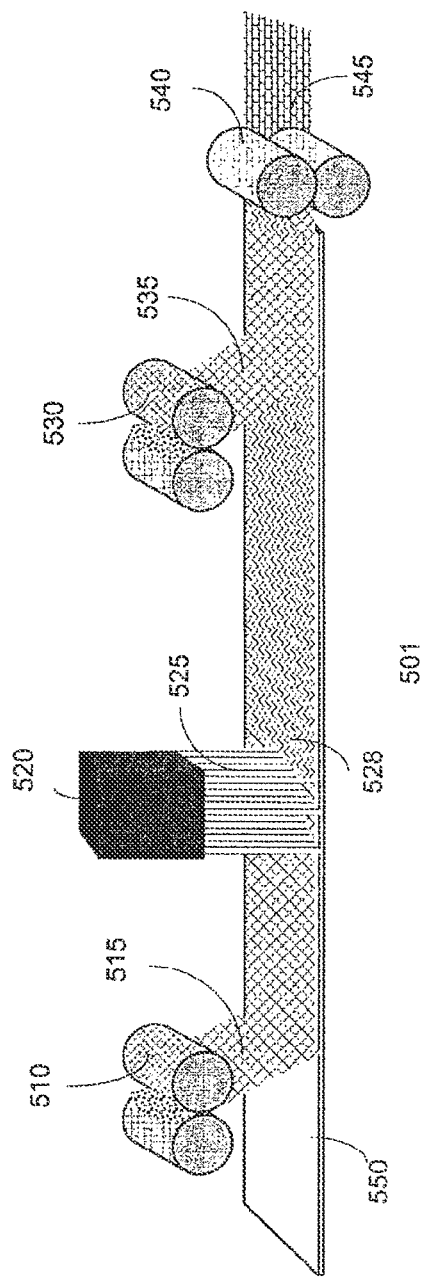
FIG. 5 shows a system for forming a food product in one embodiment of the invention.

FIG. 5 shows a system 501 for manufacturing a center-filled cereal product in accordance with one embodiment of the invention. The system comprises a first sheet forming unit 510, a strand forming unit 520, a second sheet forming unit 530, a scoring unit 540 and a conveyor belt 550.

The first sheet forming unit 510 forms a first continuous sheet of dough 515. The first sheet forming unit includes in one embodiment, a pair of counter-rotating webbed rolls. Other types of sheet forming means are contemplated and within the scope of invention. The first sheet is deposited on the conveyor belt 550, which conveys the sheet under the strand forming unit 520. The strand forming unit forms strands 525 in accordance with the present invention. The strand forming unit includes, for example, the embodiment shown in FIG. 3. The velocity of strands extruded from the strand forming unit is typically faster than the velocity of the conveyor belt to produce strands that are entangled with each other as they fall into overlapping piles 528 on the first sheet. In one embodiment, the velocity of the strands exiting the die is about 5 to about 15 times faster than the velocity of the belt. Other velocities are contemplated and within the scope of invention, depending on the desired dimensions of the center-fill mat.

The second sheet forming unit 530 forms a second continuous sheet of dough 535. The second sheet forming unit comprises, in one embodiment, a pair of counter-rotating webbed rolls. Other types of sheet forming means are contemplated and within the scope of invention. The second sheet is deposited on top of the first sheet on the conveyor belt, enclosing the strands. The resulting intermediate product is then passed through a scoring unit 540 that scores or crimps a pattern onto the intermediate product. The scoring unit includes, for example, a pair of counter-rotating scoring rolls, patterned to score the desired pattern onto the continuous sheets. Other types of scoring means are contemplated and within the scope of invention. The sheets are then baked and broken into individual pieces 545 along the scored lines.

The invention may be embodied in other specific forms without departing form the spirit or essential characteristics thereof. The foregoing embodiments, therefore, are to be considered in all respects illustrative rather than limiting the invention described herein. Scope of the invention is thus indicated by the appended claims, rather than by the foregoing description, and all changes that come within the meaning and range of equivalency of the claims are intended to be embraced therein.

What is claimed is:

1. A food product comprising:
   an outer shell having a center space therein, wherein said outer shell is formed from cooked dough sheets comprising flour of cereal grains; and
   a center-fill mat disposed in the center space, the center-fill mat comprising expanded food strands entangled with one another and disposed randomly to form a food product having a lower bulk density than a food product in which the center-fill mat is formed by unexpanded strands, wherein the food strands are expanded prior to being disposed within the center space.

2. The food product of claim 1, wherein the food strands comprise cereal.

3. The food product of claim 2, wherein the food strands further comprise at least one of flavoring agents, coloring agents, sweeteners, salt, food stabilizers, vitamins, minerals and combinations thereof.

* * * * *